United States Patent
Mirza et al.

(10) Patent No.: US 12,508,216 B2
(45) Date of Patent: Dec. 30, 2025

(54) PROCESS FOR THE PREPARATION OF ANTIMALASSEZIA POWDER

(71) Applicant: PRAJ INDUSTRIES LIMITED, Pune (IN)

(72) Inventors: Yasmin Mirza, Pune (IN); Rutuja Sameer Ankulkar, Pune (IN); Uttara Sanjay Vairagkar, Pune (IN); Durga Prasad Gupta, Pune (IN)

(73) Assignee: PRAJ INDUSTRIES LIMITED (IN)

( * ) Notice: Subject to any disclaimer, the term of this patent is extended or adjusted under 35 U.S.C. 154(b) by 242 days.

(21) Appl. No.: 17/741,951

(22) Filed: May 11, 2022

(65) Prior Publication Data

US 2023/0240961 A1 Aug. 3, 2023

(30) Foreign Application Priority Data

Jan. 28, 2022 (IN) .............. 202221004675

(51) Int. Cl.
| | |
|---|---|
| *A61Q 17/00* | (2006.01) |
| *A61K 8/02* | (2006.01) |
| *A61K 8/49* | (2006.01) |
| *A61K 8/64* | (2006.01) |
| *A61K 8/99* | (2017.01) |
| *A61Q 5/00* | (2006.01) |

(52) U.S. Cl.
CPC .............. *A61K 8/498* (2013.01); *A61K 8/022* (2013.01); *A61K 8/4973* (2013.01); *A61K 8/64* (2013.01); *A61K 8/99* (2013.01); *A61Q 5/006* (2013.01); *A61K 2800/85* (2013.01)

(58) Field of Classification Search
CPC .............................. A61Q 5/006; A61Q 17/005
See application file for complete search history.

(56) References Cited

U.S. PATENT DOCUMENTS 11,155,483 B1 * 10/2021 Tong ..................... B01D 61/16

FOREIGN PATENT DOCUMENTS

| | | | | |
|---|---|---|---|---|
| CN | 107056903 A | * | 8/2017 | ........... C07K 14/315 |
| WO | WO-2013075849 A1 | * | 5/2013 | ......... B01D 15/3809 |

OTHER PUBLICATIONS

Millipore Sigma, HPLC buffers, www.sigmaaldrich.com/US/en/products/analytical-chemistry/analytical-chromatography/hplc-buffers, 2024 (Year: 2024).*

Pingitore, E. Vera, et al. "Different strategies for purification of antimicrobial peptides from lactic acid bacteria (LAB)." Communicating current research and educational topics and trends in applied microbiology 1 (2007): 557-568 (Year: 2007).*

(Continued)

*Primary Examiner* — Louise W Humphrey
*Assistant Examiner* — Mary A Crum
(74) *Attorney, Agent, or Firm* — Billion & Armitage

(57) ABSTRACT

A process for the preparation of anti-*Malassezia* powder. The invention relates to a process the preparation of anti *Malassezia* mixture from *bacillus* species. it particularly relates to the production of antipeptide and polyketides from *bacillus* species using inexpensive fermentation medium. More particularly it relates to the use of macrolactin in anti *Malassezia* mixture.

20 Claims, 2 Drawing Sheets

(56) References Cited

OTHER PUBLICATIONS

Wu, Tao, et al. "Bacillomycin D effectively controls growth of Malassezia globosa by disrupting the cell membrane." Applied microbiology and biotechnology 104 (2020): 3529-3540 (Year: 2020).*
BD, Tryptic Soy Broth TSB, Instructions for use, 2019 (Year: 2019).*
Subtiwiki, M9 minimal medium, subtiwiki.uni goettingen.de/wiki/index.php/M9_minimal_medium, published Jul. 7, 2013 (Year: 2013).*
Phae, Chae-Gun, and Makoto Shoda. "Investigation of optimal conditions for foam separation of iturin, an antifungal peptide produced by Bacillus subtilis." Journal of fermentation and bioengineering 71.2 (1991): 118-121 (Year: 1991).*
GBiosciences, purification resins, Handbook and selection Guide, 2015 (Year: 2015).*
Mahn, Andrea, M. Elena Lienqueo, and Juan A. Asenjo. "A simple method for the estimation of protein retention in hydrophobic interaction chromatography under different operation conditions." The Open Biotechnology Journal 1.1 (2007) (Year: 2007).*
GE Healthcare, Hydrophobic interaction and reversed phase chromatography, 2006 (Year: 2006).*
Finnegan, Simon, and Steven L. Percival. "EDTA: an antimicrobial and antibiofilm agent for use in wound care." Advances in wound care 4.7 (2015): 415-421 (Year: 2015).*
Houtsma, Pauline C. The antimicrobial activity of sodium lactate. Houtsma, 1996 (Year: 1996).*
Fazle Rabbee, Muhammad, and Kwang-Hyun Baek. "Antimicrobial activities of lipopeptides and polyketides of Bacillus velezensis for agricultural applications." Molecules 25.21 (2020): 4973. (Year: 2020).*
Turhan, K. N., and M. R. Etzel. "Whey Protein Isolate and α-Lactalbumin Recovery from Lactic Acid Whey Using Cation-Exchange Chromatography." Journal of food science 69.2 (2004): fep66-fep70. (Year: 2004).*
Salazar, Francisco, Aurelio Ortiz, and Estibaliz Sansinenea. "A strong antifungal activity of 7-O-Succinyl Macrolactin A vs Macrolactin A from Bacillus amyloliquefaciens ELI149." Current microbiology 77.11 (2020): 3409-3413 (Year: 2020).*
Yánez-Mendizábal, V., et al. "Production of the postharvest biocontrol agent Bacillus subtilis CPA-8 using low cost commercial products and by-products." Biological Control 60.3 (2012): 280-289. (Year: 2012).*
Biostructure, Protein Dialysis, Desalting, and Concentration, 2021, web.archive.org/web/20210928064440/https://www.creative-biostructure.com/protein-dialysis-desalting-and-concentration-526.htm (Year: 2021).*
Vairagkar, et al., "Antagonistic Activity of Antimicrobial Metabolites Produced from Seaweed-Associated Bacillus amyloliquefaciens MTCC 10456 Against *Malassezia* spp.", Probiotics and Antimicrobial Proteins, https://doi.org/10.1007/s12602-021-09742-2, Feb. 1, 2021.
Vairagkar, et al., "Synergistic Inhibitory Activity of Bacillomycin D, Surfactin and Nisin against Thermoascus crustaceus, Neosartorya hiratsukae and Bacillus subtilis, Responsible for Cardboard Spoilage", Journal of Pure and Applied Microbiology, 2020;14(4):2555-2567. doi: 10.22207/JPAM.14.4.31, www.microbiologyjournal.org.

\* cited by examiner

PROCESS FOR THE PREPARATION OF ANTIMALASSEZIA POWDER

TECHNICAL FIELD

The invention relates to a process of the preparation of anti-*Malassezia* mixture from *bacillus* species. It particularly relates to the production of antipeptide and polyketides from *bacillus* species using an inexpensive fermentation medium. More particularly it relates to the use of macrolactin in anti-*Malassezia* mixture.

BACKGROUND

Fungi species act as primary or opportunistic pathogens to animals, plants and humans. Fungal infections can be contagious. They can spread from one person to another. In some cases, you can also catch disease-causing fungi from infected animals or contaminated soil or surfaces. Some of the common fungal infections are aspergillosis, candidiasis, cryptococcosis, histoplasmosis and mucormycosis, caused by main human pathogens such as *Candida albicans, Cryptococcus neoformans*, and *Aspergillus fumigatus*. However, superficial infections caused by members of genus *Malassezia* and some thermophilic fungi such as *Thermoascus* and *Neosartorya* are rapidly emerging.

The *Malassezia* species causes most skin diseases in humans, including dandruff. Dandruff or pityriasis capitis is the most widespread and under-diagnosed scalp problem worldwide. It is characterized by discarded stratum corneum clumped into oily white flakes. Although the precise link between the *Malassezia* fungus and dandruff is unclear, it is recognized that this fungus contributes to dandruff as follows: *Malassezia* which requires fat to grow, uses different types of lipases to hydrolyze triglycerides on the scalp surface (e.g., on corneocytes), the hydrolysis releases unsaturated fatty acid which in turn increases *Malassezia* growth and may cause inflammation and itching. *Malassezia* represents about 46% of the microflora in normal subjects, and about 74% of the microflora in subjects with dandruff. The species *Malassezia globosa* and *restricta* are reported to be the dominant species present in the human scalp, with *M. globosa* being the species with the highest lipase activity. Although antifungal agents help cure the infection, it relapses when this antifungal treatment is stopped. The popular antifungal agents used in anti-dandruff shampoos are synthetic Petro-chemicals There are reports of side effects caused by use of these agents, such as burning and redness of the skin where they are applied. Plant derived anti-dandruff agents are also available. But these have the drawback of seasonal variation, limitation on availability and they only exhibit fungistatic effects. Thus, there is a need to develop antimicrobial compositions that are water soluble, remain stable in wide pH range and have high anti-dandruff efficacy.

Antimicrobial Peptides (AMPs) have emerged as promising novel drugs to combat invasive fungal diseases. Antimicrobial peptides are evolutionarily conserved peptides which are produced by all life forms ranging from bacteria to humans. These show broad-spectrum antimicrobial activity against a wide variety of organisms such as Gram-positive, Gram-negative, fungi, viruses as well as nematodes.

Peptides produced by *Bacillus* species are useful for addressing these problems. *Bacillus* species are ubiquitous in nature; they exhibit high thermal tolerance and shorter growth rates, form resistant spores, and are thus considered to be good candidates as biological control agents.

Present invention provides the process for the production and separation of antifungal peptides from *bacillus* species, against *Malassezia* species and which has been demonstrated to control dandruff and delay relapse.

DESCRIPTION OF DRAWINGS

The invention discloses a process for the preparation of anti-*malassezia* powder by fermentation wherein a microorganism capable of producing said antibiotic peptides in a fermentation media. The features, aspects, and advantages of the present invention will become better understood when the following detailed description is read with reference to the accompanying drawings, wherein:

FIG. 2A depicts the antifungal activity of the first extract against *M. furfur*. FIG. 2B depicts the antifungal activity of the first extract against *M. furfur*. FIG. 2C depicts the antifungal activity of the first extract against *M. globosa*. FIG. 2D depicts the antifungal activity of the first extract against *M. globosa*.

DETAILED DESCRIPTION

Figure 1:
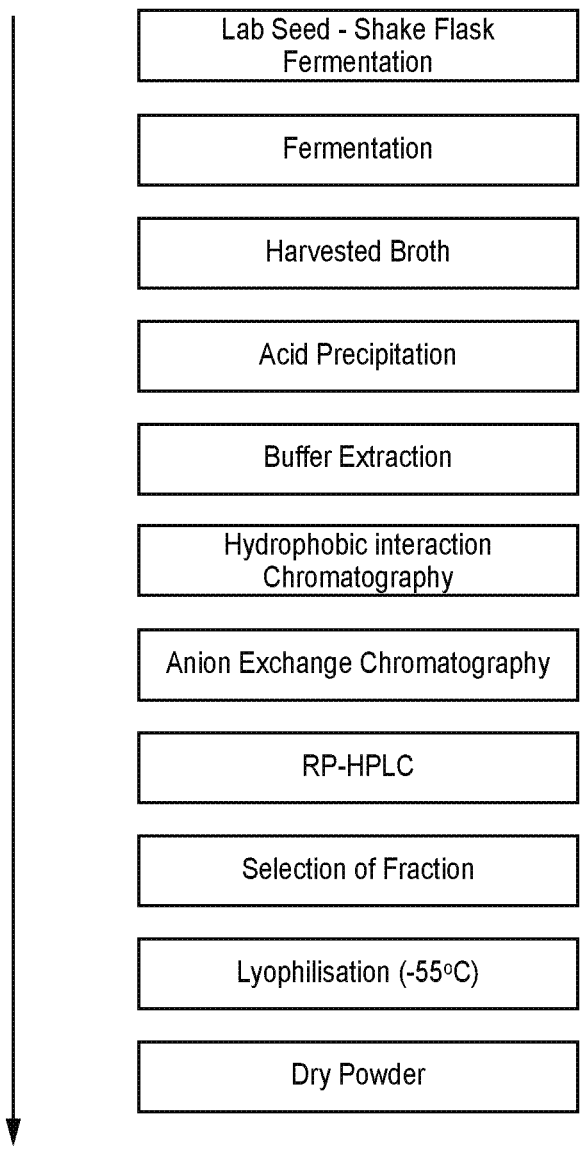
FIG. 1 depicts a process flow diagram for the preparation of an anti-*malassezia* powder by fermentation. Different elements of the process are identified, and directional movements of different streams and components formed are shown to describe the features of embodiments of the present invention.

The skin disorders caused by *Malassezia* spp. are persistent and require prolonged use of antifungal drugs. The current antifungal drugs used for the treatment of these disorders are shown to cause side effects such as burning, redness when applied to the skin, toxicity, adverse drug interaction with other medications, and high cost. Since *Malassezia* yeasts constitute the only eukaryotic member of the skin microflora, target-specific antifungal agents need to be developed. Antimicrobial peptides (AMPs) produced by *Bacillus* species represent the most promising strategy for addressing these problems.

Present invention discloses a process to produce anti *Malassezia* mixture from *bacillus* species. The present invention is more about producing antipeptide and polyketides from *bacillus* species using inexpensive fermentation medium. The process also discloses the use of macrolactin in antidandruff mixture.

In one embodiment of the present invention, said process includes following steps: 1) *Bacillus* culture 2) Indicator strain 3) Preparation of pre-fermentation culture for fermentation 4) Preparation of fermentation media 5) Fermentation 6) Analysis of First Extract 7) Separation and purification of antifungal peptide and polyketide fraction 8) Fractionation of anti-*Malassezia* peptides and polyketide 9) Preparation of final product.

Each step has one or more elements for performing specific or optional functions as required for anti *Malassezia* powder production using low-cost media. A person skilled in the art may appreciate different variations and/or combinations of these elements that may be used to perform the objects of the invention disclosed herein.

1) *Bacillus* Culture

*Bacillus* species are ubiquitous in nature; they exhibit high thermal tolerance and shorter growth rates, form resistant spores, and are thus considered to be good candidates as biological control agents. They produce a wide variety of antimicrobial compounds, including bacteriocins, ribosomally and non-ribosomally synthesized lipopeptides such as surfactins, iturins and fengycins, and polyketides such as macrolactin, bacillaene, and difficidin.

In one of the embodiments of present invention the *Bacillus amyloliquefaciens* (NCIMB 10785) and *Bacillus velezensis* (NCIMB 8646) are procured from NCIMB, Scotland. The Luria Bertani Broth is used for pre-culturing and maintaining the *bacillus* strain in 20% glycerol at −80. The optimal growth temperature for *bacillus* culture is about 37° C.

2) Indicator Strains:

Three indicator strains are used for this study. *Malassezia furfur* ATCC 44344, *Malassezia furfur* ATCC 12078 and *Malassezia globosa* MYA 4612. *Malassezia. furfur* ATCC 44344 and *M. furfur* 12078 were cultured and maintained on Sabouraud dextrose broth containing 1% Tween 80 and *M. globosa* ATCC MYA 4612 was grown on modified Leeming & Notman broth (mLNB) containing 1% bacteriological peptone, 1% glucose, 0.2% yeast extract, 0.8% ox bile desiccated, 1% glycerol, 0.05% glycerol monostearate, 0.5% Tween 60 and 2% olive oil at 30° C. These indicator strains are only used to identify the anti-*malassezia* activity of fermentation broth of *bacillus* species.

3) Preparation of Pre-Fermentation Culture for Fermentation:

The culture is revived on nutrient agar plate. Said plates are incubated for about 24 to about 48 hrs at 37° C. Single isolate from plate is inoculated to 100 ml sterile nutrient broth having about 7 pH and incubated at 37° C. for between 8 and 18 hours. Next, said 100 ml active culture is inoculated in 900 ml sterile nutrient broth and incubated it at 37° C. for between 8 and 18 hours after which it is used further for fermentation.

4) Preparation of Fermentation Media:

The media composition for fermentation comprises $Na_2HPO_4 \cdot 2H_2O$, $KH_2PO_4$, $NH_4Cl$, NaCl and sugar with other micronutrients. Fermenter is sterilized at 121° C. for 20 min having $Na_2HPO_4 \cdot 2H_2O$, $KH_2PO_4$, $NH_4Cl$ and NaCl. Glucose and other micronutrients are sterilized separately and added in the fermenter along with 10% of inoculum of *Bacillus* culture to make the total volume in the fermenter.

In yet another embodiment of the invention, alternative cheap carbon and nitrogen sources like molasses or maize starch or soyabean meal are used to produce antifungal peptides and polyketides wherein C:N ratio is about 20:1. It is described in detail in table 6.

5) Fermentation:

The fermenter broth is fermented for about 72 hours at about 30° C. with continuous stirring between 100 and 150 rpm stirring speed. Throughout the time of fermentation, the broth is continuously aerated with air speed, of about 0.1 vvm. Next, the whole cell fermentation broth is harvested, and Its pH is adjusted to about 2.0 using 6N HCl and cooled to about 4° C. for about 12 hours forming a first acidic stream. Then solids is separated from the said first acidic stream by centrifugation. Said solid stream is resuspended in buffer at neutral pH forming a second stream. first extract is separated from second stream using centrifugation at 4° C. which was used for further process. The said first extract is freeze dried and used for analysis of zone of inhibition, MIC and time kill assay.

6) Analysis of First Extract:

said first extract is analyzed for antifungal activity using agar plate diffusion assay and by time kill procedure. In agar plate diffusion assay, Clear zones of inhibition is observed against indicator strains. For time-kill procedure, the inoculum suspension of indicator strains of *Malassezia* (105 CFU/mL) is exposed to different concentration of First extract. Then, 50-µL aliquots is withdrawn at fixed intervals and evaluated. All the three indicator strains showed sensitivity to First extract within 15 min of exposure. Said first extract is used further for down streaming to separate the antifungal peptides.

7) Separation and Purification of Antifungal Peptide and Polyketide Fraction:

The antifungal peptides and polyketides are separated using hydrophobic interaction chromatography (HIC). The first extract is mixed with 2N NaCl which is loaded on stationary phase or column having 6% cross linked substituted agarose polymer having phenyl group substitution, at a desired flow rate and further equilibrated with Sodium lactate buffer (having 20 mM Sodium lactate+2 M NaCl). The column is washed with five-bed volumes of equilibration buffer and first elution is carried out using three column volumes of 20 mM Tris(hydroxymethyl)aminomethane (hereafter "Tris buffer") of pH 8.5. Flow-through, wash and elution fractions from multiple runs is collected according to their absorbance at 280 nm. The collected first eluent from HIC chromatography is purified further by anion exchange chromatography.

Said first eluent obtained after HIC is loaded on column filled with Q Sepharose Fast Flow strong anion exchange resin equilibrated with 20 mM Tris buffer of pH 8.5. The column is washed with ten-bed volumes of equilibration buffer and eluted in five-bed volumes of Tris buffer. Flow through, wash and elution fraction from multiple runs is collected to obtain pure antifungal mixture according to their absorbance at about 280 nm. The purity of the antifungal peptides and polyketides increased about 20-fold as compared to the crude fermentation broth. The yield of the purified peptides and polyketides is about 40% based on total antifungal activity against *Malassezia* (Table 1).

8) Fractionation of Anti-*Malassezia* Peptides and Polyketide:

Pure antifungal mixture obtained after anion exchange chromatography is used further for reverse phase HPLC. Said mixture is fractionated on a C18 column using 20 mM of Tris buffer solution as eluent. The separation of the antifungal peptides is done by gradient elution using about 0.1% trifluoroacetic acid in HPLC grade deionized water (A) and about 0.1% trifluoroacetic acid in acetonitrile (B). about 7 fractions are collected at Eluted peaks having retention time of about 24.5, 28.2, 30.1, 32.2, 34.5 and 37.1 minutes and seventh fraction is obtained from 38 to 43 minutes according to the absorption profile at 220 nm and 280 nm using the fraction collector and freeze-dried. Individual fractions are labelled as 1, 2, 3, 4, 5, 6 and 7 in the order of increasing retention times, dissolved in sterile distilled water and then tested for their individual antifungal activity, yield, MIC. also Identify them by mass spectrometry.

9) Preparation of Final Product:

Next, due to analysis, it is observed that Fractions 1, 5, 6 and 7 as mentioned in example nos 1 to 6 have strongest anti-fungal activity against *Malassezia*. Said fraction are mixed together and drying it at −55° C. to get the final product. This fraction comprises of bacilysin, bacillomycin D homologue, macrolactin, 7-O-succinylmacrolactin-A. These fractions have a synergistic effect and have strong antifungal activity against *Malassezia* species.

The process afforded Between 30 µg and 60 µg total protein with macrolactin and having minimum inhibitory concentration in the range of about 10 to about 70 µg/mL against *Malassezia* species. Said final product is used in formulation of scalp treatment or in hair care product.

The process has several advantages over the known methods as listed below:

Use of simple and inexpensive media component which helps to make this process more economical than earlier process.

Anti-*Malassezia* powder is produced by fermentation of *Bacillus* sp, a bacterial species having probiotic properties.

The process is scalable and cost-effective.

The final dry powder is non-irritant, water-soluble, stable at a wide pH range. It is a naturally-derived and eco-friendly anti-dandruff product.

Macrolactin and and 'succinyl moiety at C-7' of 7-O-succinylmacrolactin A use in antidandruff powder with other peptides would ultimately reduce their dosage levels, reduce toxicity levels and increase the inhibitory spectrum of final formulation which is used for hair care product.

Examples provided below give wider utility of the invention without any limitations as to the variations that may be appreciated by a person skilled in the art. A non-limiting summary of various experimental results is given in the examples, which demonstrate the advantageous and novel aspects of the process for the preparation of peptide and polyketides from *bacillus* species using inexpensive fermentation medium.

EXAMPLES

Example 1: Preparation of Inoculum of *Bacillus velezensis* for Fermentation

About 1 ml of culture from glycerol stock was inoculated to the sterile nutrient broth and incubated at 37° C. for 8 hours. Next, said 100 ml active culture was inoculated in 900 ml sterile nutrient broth and incubated it at 37° C. for 18 hours after which it was used further for fermentation.

Example 2: Fermentation to Produce Antifungal Peptides

In 1.3 L fermenter, about 480 ml media was prepared having concentration of $Na_2HPO_4 \cdot 2H_2O$, about 8.5 g/L, $K_2HPo_4$, about 3 g/L, $NH_4Cl$ about 1 g/L and NaCl about 0.5 g/L. Said fermenter was sterilized at 121° C. for 20 min. Glucose solution having concentration of glucose about 20 g/L, about 0.0147 g/L $CaCl_2$, about 0.246 g/L $MgSo_4$, about 0.0135 g/L $FeCl_3$, and about 0.021 g/L citric Acid was sterilized separately and added in the fermenter along with 10% of inoculum of *Bacillus velezensis*. The batch volume was maintained at 500 ml. Said fermentation was carried out for about 72 hours at about 30° C., of about 0.1 vvm. Next, the whole cell fermentation broth was harvested. Its pH was adjusted to about 2 using 6N HCl and cooled to about 4° C. for about 12 hours. Solids were separated by centrifugation and dissolved in 0.1 M sodium phosphate buffer at pH 7.4. Supernatant was then separated from above mixture by centrifugation to form a first extract and it was further subjected to down streaming to separate the antifungal peptides.

Example 3: Separation of Antifungal Peptide Fraction

The antifungal peptides were separated using hydrophobic interaction chromatography (HIC). 17 gms NaCl was dissolved in about 150 ml of first extract to obtain a 2N strength of NaCl which was loaded on 6% cross linked substituted agarose polymer column having 25 ml phenyl Sepharose, at a flow rate of about 4 ml/min and further equilibrated with pH 3.2 Sodium lactate buffer (20 mM Sodium lactate+2 M NaCl). The column was washed with five-bed volumes of equilibration buffer and elution was carried out using three column volumes of 20 mM Tris buffer having pH 8.5. Flow-through, wash and elution fractions from multiple runs were collected according to their absorbance at 280 nm. About 50 ml collective fraction collected from HIC chromatography was purified further by anion exchange chromatography.

Example 4: Purification of Antifungal Peptides

Said 50 ml of active fraction obtained after HIC was loaded on column filled with 1 ml of Q Sepharose Fast Flow strong anion exchange resin equilibrated with 20 mM Tris buffer having pH 8.5 at a flow rate of 0.6 mL/min. The column was washed with ten-bed volumes of equilibration buffer and eluted in five-bed volumes of Tris buffer. Flow through, wash and elution fraction from multiple runs was collected according to their absorbance at 280 nm. About 15 ml collective fraction was collected from anion exchange chromatography (AEC). The purity of the antifungal peptides increased 20-fold as compared to the crude fermentation broth. The yield of the purified peptides was 40% based on total antifungal activity against *Malassezia* (Table 1).

TABLE 1

Recovery of antifungal peptides after above two step chromatography from *B. velezensis*.

| Purification step | Volume (ml) | Total protein (mg) | Total activity (AU) | Specific activity (AU/mg) | Yield (%) | Purification (Fold) |
|---|---|---|---|---|---|---|
| First extract | 150 | 933 | 24000 | 25.72 | 100 | 1 |
| HIC (Phenyl sepharose resin) | 50 | 200 | 16000 | 80 | 66 | 3 |
| AEC (Q sepharose resin) | 15 | 20 | 9600 | 480 | 40 | 20 |

Example 5: Fractionation of Antifungal Peptides

About 15 ml fraction which was obtained after anion exchange chromatography was lyophilized to get about 1500 mg of dry powder. About 50 mg was mixed with 1 ml sodium phosphate buffer and then said solution was injected to Scalar C18 column. The separation of the antifungal peptides was carried out by binary solvent gradient elution system comprising about 0.1% trifluoroacetic acid in HPLC grade deionized water (eluent A) and about 0.1% trifluoroacetic acid in acetonitrile (eluent B). The gradient program was as follows between: 0 to 20 min, 0-40% B, 20-30 min, 40 to 80% B, 30 to 35 min, 80 to 100% B, 35 to 45 min, 100 to 0% B at a flow rate of about 1.0 mL/min at 30° C., Six separate fractions were collected at retention times of 24.5, 28.2, 30.1, 32.2, 34.5 and 37.1 minutes and seventh fraction was collected from 38 to 43 minutes according to the absorption profile at 220 nm and 280 nm using the fraction collector and further freeze-dried. Individual fractions were labelled as 1, 2, 3, 4, 5, 6 and 7 in the order if increasing retention times, dissolved in sterile distilled water and then tested for their individual antifungal activity. It was observed that fractions 1, 6 and 7 exhibited the strongest antifungal activity which resulted in clear inhibition zones (Table 2). And fraction 5 was not reported against *M. furfur, M. globose* species. For experiment the 0.1 M sodium phosphate buffer was used as a negative control and Ketoconazol was used as a positive control

TABLE 2

Determination of inhibition zone against *Malassezia* sp.

| | Zone of inhibition (mm) | |
|---|---|---|
| Fraction no. | *M. furfur* | *M. globosa* |
| Negative control | — | — |
| 1 | 5 ± 0.32 | 6 ± 0.48 |
| 2 | 2 ± 0.45 | 2 ± 0.42 |
| 3 | 3 ± 0.26 | 2 ± 0.25 |
| 4 | — | — |
| 5 | 2 ± 0.77 | 2 ± 0.69 |
| 6 | 6 ± 0.7 | 7 ± 0.65 |
| 7 | 6 ± 0.8 | 5 ± 0.81 |
| Positive control | 12 ± 0.65 | 11 ± 0.64 |

Example 6: Determination of Minimum Inhibitory Concentration (MIC) and Minimum Fungicidal Concentration (MFC)

The MIC of first extract and individual fractions (1-7) which were collected from RP-HPLC was calculated by 'broth microdilution technique' in 96-well microtiter plates. Said MIC values were evaluated against those exhibited by *M. furfur, M. globosa* and. As a positive control, commercially used antifungal drug ketoconazole was used in concentrations ranging from 32 μg/mL to 0.0156 μg/mL. The plates were incubated at 30° C. for *Malassezia* spp and the results were recorded after 48 h and 7 days. The minimum inhibitory concentration (MIC) was measured as the lowest sample concentration that could inhibit the fungal growth.

TABLE 3

MIC and MFC values of the antifungal peptides produced from *B. velezensis*

| | MFC/MIC range (μg/mL) | | |
|---|---|---|---|
| Fraction name | *M. furfur* | *M. furfur* | *M. globosa* |
| First extract | 68/34 | 68/34 | 50/25 |
| Fraction 1 | 100/50 | 110/50 | 100/30 |
| Fraction 2 | >228 | >228 | >228 |
| Fraction 3 | >228 | >228 | >228 |
| Fraction 4 | >228 | >228 | >228 |
| Fraction 5 | 313/156 | 330/165 | 275/138 |
| Fraction 6 | 96/48 | 96/48 | 96/48 |
| Fraction 7 | 113/56 | 90/48 | 80/38 |
| Ketoconazole | 0.1/0.03 | 0.1/0.03 | 0.08/0.03 |

The ratio of MIC to MFC values of all the fractions against the tested strains was found to be the 2.0 which indicated specific fungicidal effect of the individual peptides on the target strains.

Example 7: Identification of Antifungal Compounds by Mass Spectrometry

The purified fractions were characterized with the help of Mass Spectrometry. In order to conduct mass spectrometric analysis, a Phenomenex ECC 18 column (4.6×250 mm×5 μm) equipped with an electrospray ionization source was used. The capillary voltage was set at 4000 V with dry gas flow at 11 L/min and a temperature of 290° C. The mass analysis was performed in positive and negative-ion mode and the mass spectra were screened from m/z values of 200-2000. The antifungal compounds were identified, as shown in table 4 by matching with the exact calculated monoisotopic masses, adducts and their mass fragmentation patterns.

TABLE 4

Antifungal compounds produced by *B. amyloliquefaciens* detected by Mass spectrometry

| Fraction no. | Assignment | Retention time (min) | Actual LC/HRESI-MS data (m/z) | Reported LC/HRESI-MS data (m/z) |
|---|---|---|---|---|
| 1 | Bacilysin, chloratetaine related compounda | 24.5 | 271.1, 288.08 | 270.28 287.08 |
| 2 | C14 Bacillomycin D | 28.2 | 1031.5 | 1030 |
| 3 | C15 Bacillomycin D | 30.1 | 1045.4 | 1044 |
| 4 | C16 Bacillomycin D | 32.2 | 1059.3 | 1059 |
| 5 | Macrolactin A | 34.5 | 367.2 | 402 |
| 6 | 7-O-succinylmacrolactin A | 37.1 | 525.3 | 502.6 |
| 7 | Macrolactin Z, Macrolactin Ma, Macrolactin Pa, Macrolactin Ua, Macrolactin B/Ca | 38 | 539.2853, 417.2093, 596.3330, 503.3134, 565.2997 | 516.6, 439.24, 578.7, 480.7, 603.27 |

Example 8: Recovery of Antifungal Peptides by Reverse Phase—High Performance Chromatography for the Production in the Form of Dry Powder About 15 ml fraction which was obtained after anion exchange chromatography was lyophilized to get about 1500 mg of dry powder. About 50 mg fraction from it was injected to Scalar C18 column. The separation of the antifungal peptides was done by gradient elution using about 0.1% trifluoroacetic acid in HPLC grade deionized water (A) and about 0.1% trifluoroacetic acid in acetonitrile (B). about 7 fractions were collected at Eluted peaks were collected at retention times of 24.5, 28.2, 30.1, 32.2, 34.5 and 37.1 minutes and seventh fraction were obtained from 38 to 43 minutes according to the absorption profile at 220 nm and 280 nm using the fraction collector and freeze-dried to check the total yield.

TABLE 5

Total recovery of each fraction from first extract

| Fractions | Dry Powder in mg/L | Total protein (μg/ml) |
|---|---|---|
| Bacilysin | 9 | 13.25 |
| C14 Bacillomycin D | 264 | 53.875 |
| C15 Bacillomycin D | 150 | 56.375 |
| C16 Bacillomycin D | 30 | 23.25 |
| Macrolactin A | 48 | — |
| 7-0-succinyl macrolactin A | 216 | — |
| Fraction 7 (Group of unidentified macrolactins) | 396 | 21.375 |

Example 8: Preparation of Final Anti-*Malassezia* Product

Fractions 1, 5, 6 and 7 as mentioned in example nos 1 to 6, were mixed to form a composite powder of about 670 mg having specific anti-fungal activity against *Malassezia*.

Example 9: Fermentation of *Bacillus velezensis* on Alternate Media

Alternative cheap carbon and nitrogen sources were used to produce antifungal peptides. Said fermentation was performed for 72 h at 30° C. with agitation at 150 rpm in 200 mL of the fermentation media having C:N ratio of 20:1. Table 4 depicts the total yield of the first extract (g/L) and the activity units (AU/mL) for each of the different media used.

TABLE 6

Anti-dandruff Activity of *Bacillus velezensis* in different media

| Ingredients | Yield (g/L) | Anti-dandruff Activity (AU) |
|---|---|---|
| Molasses + Peptone | 5.0 | 6000 |
| Glycerol + Peptone | 7.0 | 5500 |
| Methanol + Peptone | 4.0 | 4500 |
| Maize starch + Peptone | 4.2 | 3000 |
| Soyabean meal + Glucose | 6.0 | 4000 |
| Soya flour + Glucose | 3.0 | 4500 |
| CSL + Glucose | 5.0 | 6000 |
| Casein + Glucose | 4.0 | 4500 |
| Urea + Glucose | 1.0 | 500 |

Example 10: Comparison of Anti-*Malassezia* Powder Effectiveness on *Malassezia* Infected Subject with Commercial Shampoo About 30 mg of powder (having between 9 and 10% peptide) was mixed with 1 ml of sodium phosphate buffer and used against *Malassezia* infected subject. The test product quantity used for male was 3 ml and for female 5 ml. A total of 45 healthy male and female subjects aged between 20-45 participated in the study where the data of 40 completed subjects was considered for analysis. The subjects were telephonically instructed not to wash their hair for 48 hrs prior to the screening/baseline visit. 1st visit (day 1) was a screening visit during which the subjects were evaluated based on the study inclusion-exclusion criteria and screening assessment were performed. During screening visit, only subjects with moderate dandruff score above 20 (adherent and non-adherent dandruff) for each lateral side (left and right) along with itching were made eligible to participate in the study.

Further, the trained personnel washed the subject's split head with neutral shampoo on one side followed by test product application (which was rinsed with normal water after 20 min) and the other half was washed with comparator (Commercially available labelled antidandruff Shampoo) Treatment phase was conducted after dermatological assessments and microscopic imaging. During treatment phase, the subjects visited the research centre three times in a week for 4 weeks to have their hair washed by trained personnel.

The study was conducted to evaluate the efficacy of the test product qualitatively in reducing the total dandruff and to determine the prolong effect of the test product. In comparison to commercial other anti-Dandruff Shampoo, test product showed significantly better result in reduction of dandruff occurrence level, adherent dandruff, non-adherent dandruff, severity of dandruff flakes and itching in both treatment and regression phase. This implies that the test product was superior to comparator for all the parameters.

Example 11: Bioprocessing for Production of Antifungal Proteins

In 100 L fermenter, about 63 L M9 media ($Na_2HPo_4 \cdot 2H_2O$: 8.5 (g/l), $K_2HPO_4$: 3 (g/l), $NH_4Cl$: 1 (g/l), NaCl: 0.5 (g/l) was prepared. Said fermenter was sterilized at 121° C. for 20 min. $CaCl_2$: 0.0147 (g/l), $MgSo_4$: 0.246 (g/l), $FeCl_3$: 0.0135 (g/l), Citric Acid: 0.021 (g/l) trace elements and 20 (g/l) glucose were sterilized separately and added in the fermenter with 10% of inoculum of *Bacillus velezensis*. Said fermentation was carried out for about 48 hours at about 30° C., about 100 rpm having aeration of about 0.1 vvm. Next, the whole cell fermentation broth was harvested after adjusting the pH to about 2 using 6N HCl. Supernatant was then separated from whole cell biomass using centrifugation. Said process produced about 551.7 g biomass. The biomass was mixed with about 16.5 L of 0.1 M sodium phosphate buffer (pH 7.4) and homogenized with overhead stirrer. Next, the homogenized mixture was used for centrifugation at 15000 rpm. About 16.6 L first extract were produced. Said first extract were dried at 45° C. for 48 h to obtain about 3 g/L antifungal powder as a final product. The obtained dry powder was stored at 4° C. This process afforded about 9% w/w total protein having MIC 137 µg/mL against *Malassezia furfur*.

Example 12: Stability Study of First Extract

Stability study of first extract was checked against inhibitory enzymes, change of pH and temperature—
a) For inhibitory enzymes stability—the first extract was treated with 1 mg/mL of Proteinase K in 0.05 M Tris HCl buffer pH 8.0, Lipase in 0.1 M phosphate buffer, pH 7.4 and alpha-amylase prepared in 0.02 M phosphate buffer, pH 7. at 37° C. for 3 h.
b) For determining temperature stability—first extract was subjected to various temperatures from 20-100° C. for 30 min.
c) For pH stability—the pH of first extract sample was raised from 2 to 12 using NaOH and maintained for 2 h at 25° C.

TABLE 7

Stability study of the antifungal activity of first extract from *B. velezensis*

| Treatment | Residual activity (%) | Treatment | Residual activity (%) |
|---|---|---|---|
| Control | 100 | Control | 100 |
| Heat treatment | | pH treatment | |
| 20° C./30 min | 100 | 2 | 80 |
| 40° C./30 min | 100 | 3 | 80 |
| 60° C./30 min | 90 | 4 | 90 |
| 80° C./30 min | 65 | 5 | 90 |
| 100° C./30 min | 40 | 6 | 100 |
| Storage | | 7 | 100 |
| 4° C./365 days | 100 | 8 | 80 |
| 25° C./90 days | 100 | 9 | 40 |
| −20° C./365 days | 100 | 10 | 20 |

TABLE 7-continued

Stability study of the antifungal activity of first extract from *B. velezensis*

| Treatment | Residual activity (%) | Treatment | Residual activity (%) |
|---|---|---|---|
| Inhibitor treatment | | | |
| Proteinase K (1 mg/mL) | 90 | | |
| Trypsin (1 mg/mL) | 90 | | |
| Lipase (1 mg/mL) | 90 | | |
| Alpha-amylase (1 mg/mL) | 100 | | |

Figure 2A:
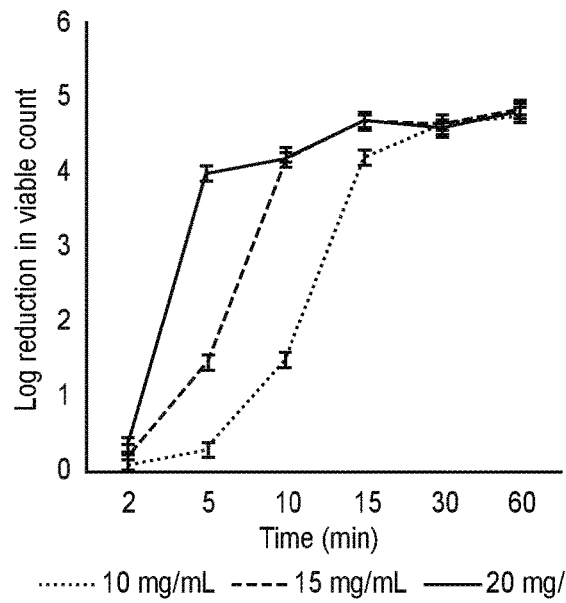
FIGS. 2A-D depict the antifungal activity of first extract over time which is evaluated by the time-kill procedure.
Figure 2B:
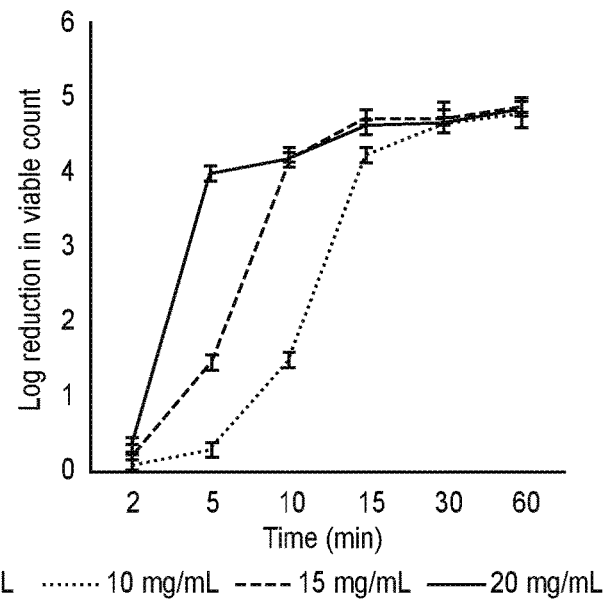
Figure 2C:
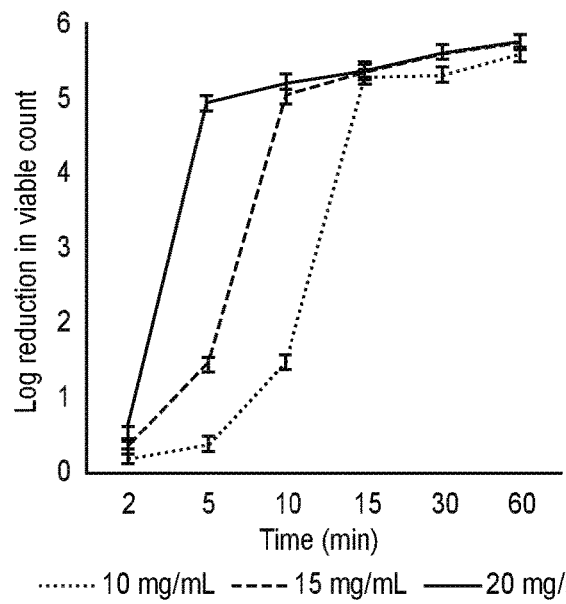
Figure 2D:
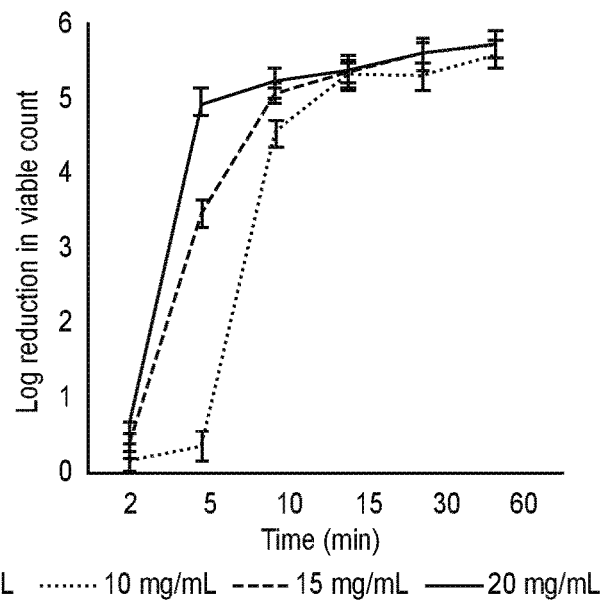

Example 13: Time-Kill Assay of the First Extract from *B. velezensis* against a. *M. furfur* b. *M. globosa* c Antifungal activity of first extract over time was evaluated by the time-kill procedure where inoculum suspensions of indicator strains were exposed to first extract having peptide concentrations 10 mg/mL, 15 mg/mL and 20 mg/mL. Then, 50 µL aliquots were withdrawn at fixed intervals (2, 5, 10, 15 and 30 min), washed and spread on to modified Dixon medium for *Malassezia* spp. The colony count was noted as CFU/mL after 48 h. The inhibition was observed within 5 min for 20 mg/mL, 10 min for 15 mg/mL and 15 min for 10 mg/mL of the test sample. (FIGS. 2A-D)

The invention claimed is:

1. A process for the preparation of antimalassezia powder by fermentation comprising:
   a) providing a microorganism capable of producing antibiotic peptides in a fermentation media to form a microbial culture;
   b) cultivating said microbial culture in a nutrient broth at pH of about 7 for between 8 and 18 hours to form an activated culture;
   c) fermenting said activated culture in fermentation media of desired composition to form a whole cell broth;
   d) adjusting the pH of said whole cell broth to acid and cooling it to 4° C. for about 12 hours to form a first acidic stream;
   e) separating a solid stream from said first acidic stream;
   f) resuspending said solid stream in buffer at neutral pH to form a second stream;
   g) separating a supernatant from said second stream using centrifugation at 4° C. to form a first extract;
   h) subjecting the first extract to hydrophobic interaction chromatography to separate peptides and polyketides from other impurities to form a first eluent;
   i) subjecting said first eluent to anion exchange chromatography to form an active pure antifungal mixture;
   j) fractionating said active pure antifungal mixture using reverse phase high performance liquid chromatography into different fractions; and
   k) mixing desired fractions of the different fractions and drying the mixture of desired fractions at about −55° C. to form the antimalassezia powder.

2. The process of claim 1, wherein said microorganism is a *Bacillus* species that produces compounds with antifungal activity against *Malassezia* species.

3. The process of claim 1, wherein said fermentation media comprises $Na_2HPO_4 \cdot 2H_2O$, $KH_2PO_4$, $NH_4Cl$, NaCl, sugar, and micronutrients.

4. The process of claim 1, wherein said fermentation is performed at about 30° C., between 100 and 150 RPM for about 72 hours and 0.1 vvm air.

5. The process of claim 1, wherein said solid stream is resuspended in sodium phosphate buffer having pH about 7 to about 7.5.

6. The process of claim 1, wherein a stationary phase employed in said hydrophobic interaction chromatography is 6% cross linked substituted agarose polymer having phenyl group substitution.

7. The process of claim 1, wherein said hydrophobic interaction chromatography is performed using mixed solution of 20 mM sodium lactate and 2 M sodium chloride.

8. Process of claim 1, wherein a hydrophobic interaction chromatography column employed in said hydrophobic interaction chromatography is eluted with 20 mM of Tris (hydroxymethyl)aminomethane buffer solution to obtain said first eluent.

9. Process of claim 1, wherein the first eluent is equilibrated with 20 mM of Tris(hydroxymethyl)aminomethane buffer solution and passed through anion exchange resin column to obtain pure antifungal mixture.

10. Process of claim 1, wherein said active pure antifungal mixture is fractionated on a C18 column using 20 mM of Tris(hydroxymethyl)aminomethane buffer solution as eluent.

11. Process of claim 1, wherein said desired fractions comprise bacilysin, bacillomycin D homologues, macrolactins, and 7-O-succinyl macrolactin-A.

12. Process of claim 1, wherein said desired fractions comprise bacilysin, macrolactins, and 7-O-succinylmacrolactin-A.

13. Process of claim 1, wherein said desired fractions have a synergistic effect against fungi having minimum inhibitory concentration in a range of about 10 to about 70 µg/mL.

14. Process of claim 1, wherein the antimalassezia powder is used in formulation of hair care products.

15. Process of claim 2, wherein the *Bacillus* species is *Bacillus velezensis* or *Bacillus amyloliquefaciens*.

16. Process of claim 1, wherein said desired fractions have antifungal activity against *Malassezia* species.

17. Process of claim 1, wherein said fermentation media has a carbon to nitrogen (C:N) ratio of about 20:1.

18. Process of claim 17, wherein said fermentation media comprises:
   peptone; and
   molasses, glycerol, methanol, or maize starch.

19. Process of claim 17, wherein said fermentation media comprises:
   glucose; and
   soyabean meal, soya flour, corn steep liquor (CSL), casein, or urea.

20. Process of claim 17, wherein said fermentation media consists of either:
   peptone and one of molasses, glycerol, methanol, or maize starch; or
   glucose and one of soyabean meal, soya flour, corn steep liquor (CSL), casein, or urea.

* * * * *